United States Patent
Nauta

(10) Patent No.: US 6,984,285 B2
(45) Date of Patent: Jan. 10, 2006

(54) SPLICER FOR SPLICING STRIPS OF IN RUBBER MATERIAL EMBEDDED CORDS TO EACH OTHER

(75) Inventor: Klaas Nauta, Rosenhoflaan (NL)

(73) Assignee: VMI EPE Holland B.V., Epe (NL)

( * ) Notice: Subject to any disclaimer, the term of this patent is extended or adjusted under 35 U.S.C. 154(b) by 0 days.

(21) Appl. No.: 10/376,031

(22) Filed: Feb. 27, 2003

(65) Prior Publication Data
US 2003/0141021 A1    Jul. 31, 2003

Related U.S. Application Data

(63) Continuation of application No. PCT/NL01/00646, filed on Sep. 3, 2001.

(30) Foreign Application Priority Data
Sep. 1, 2000    (NL) .................................... 1016078

(51) Int. Cl.
B32B 31/10    (2006.01)

(52) U.S. Cl. .................. 156/264; 156/304.1; 156/512; 156/558

(58) Field of Classification Search .............. 156/157, 156/159, 304.1, 502, 507, 264, 512, 304.6, 156/558
See application file for complete search history.

(56) References Cited

U.S. PATENT DOCUMENTS

| | | | | |
|---|---|---|---|---|
| 1,189,724 A | * | 7/1916 | De Courcy | 156/266 |
| 1,961,725 A | * | 6/1934 | Abbott, Jr. | 156/398 |
| 3,130,100 A | * | 4/1964 | Hasselquist | 156/157 |
| 3,832,261 A | * | 8/1974 | Brey et al. | 156/396 |
| 3,888,720 A | | 6/1975 | Habert | |
| 4,221,627 A | * | 9/1980 | Rost | 156/507 |
| 4,409,872 A | * | 10/1983 | Bertoldo | 83/155 |
| 4,411,724 A | * | 10/1983 | Ito et al. | 156/304.1 |
| 4,457,802 A | * | 7/1984 | Yanagihara et al. | 156/405.1 |
| 4,892,609 A | * | 1/1990 | Nakanome et al. | 156/406.4 |
| 4,961,813 A | * | 10/1990 | Bailey | 156/406.4 |
| 4,976,807 A | * | 12/1990 | Irie et al. | 156/405.1 |
| 5,059,268 A | * | 10/1991 | Satoh et al. | 156/130.3 |
| 5,271,790 A | * | 12/1993 | Nojiri et al. | 156/405.1 |
| 5,514,233 A | * | 5/1996 | Miyamoto | 156/64 |

(Continued)

FOREIGN PATENT DOCUMENTS

DE    43 09 013    9/1994

(Continued)

OTHER PUBLICATIONS

EV Translation for EP0618064 of Sep. 1996.

(Continued)

Primary Examiner—Mark A. Osele
(74) Attorney, Agent, or Firm—Ladas and Parry LLP

(57) ABSTRACT

The invention relates to a splicer for splicing strips of in rubber material embedded cords to each other, the splicer I comprising a supply device (3) having an output side (30), for supplying the strips in a supply direction, a transport device (32, 24) in line with the supply device and having an input side (36, 38) oriented at the output side of the supply device. The transport device (33, 24) is adapted for transporting the strips. The splicer further comprises a splicing unit for splicing strips to each other along a splice line which splice line intersects the transport device at an angle alpha. The transport device comprises at least two transport means that are substantially parallel on to the other.

23 Claims, 3 Drawing Sheets

U.S. PATENT DOCUMENTS 6,280,556 B1 * 8/2001 Okada et al. ................ 156/264
6,695,949 B1 * 2/2004 Jungk et al. ............. 156/406.4

FOREIGN PATENT DOCUMENTS

WO     WO01/12423    *   2/2001

OTHER PUBLICATIONS

Online European Patent Register—Results for EP 0618064 of Jun. 2005.

* cited by examiner

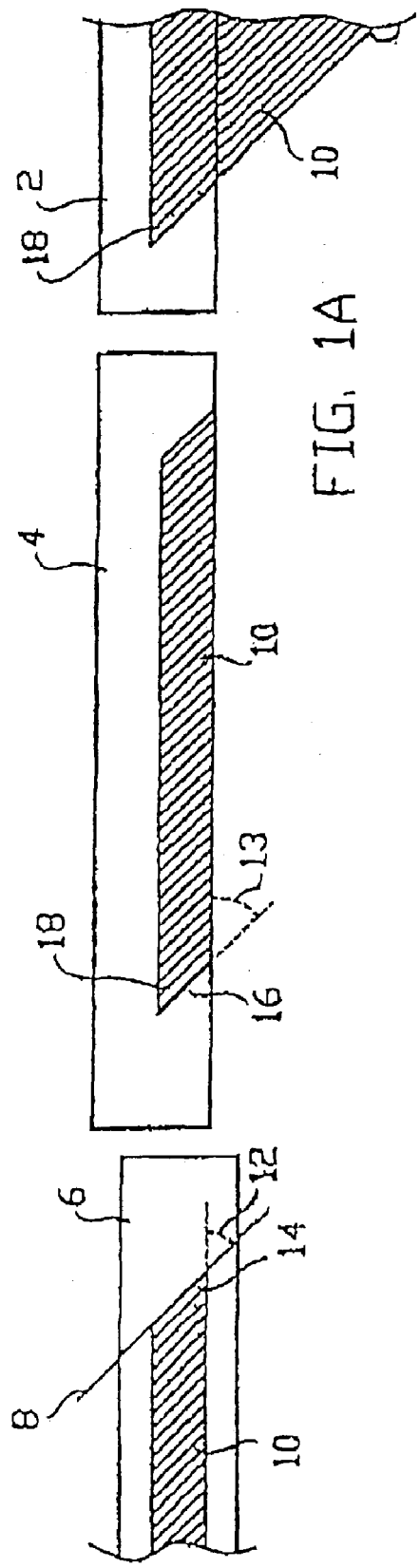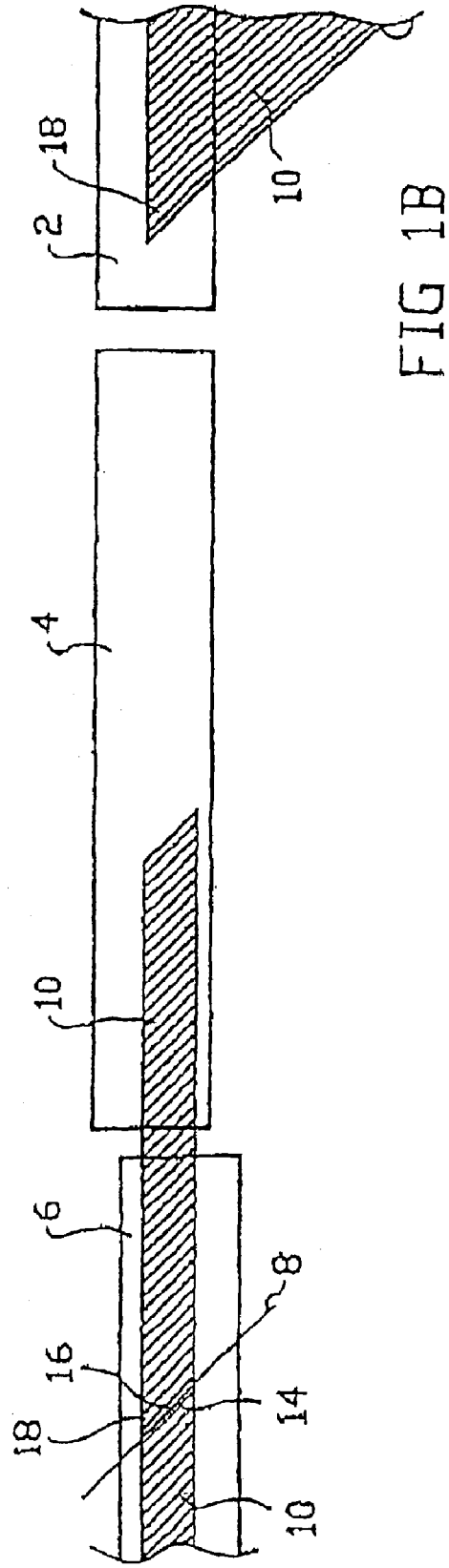

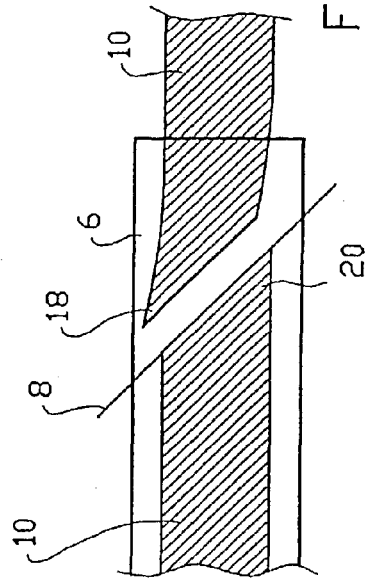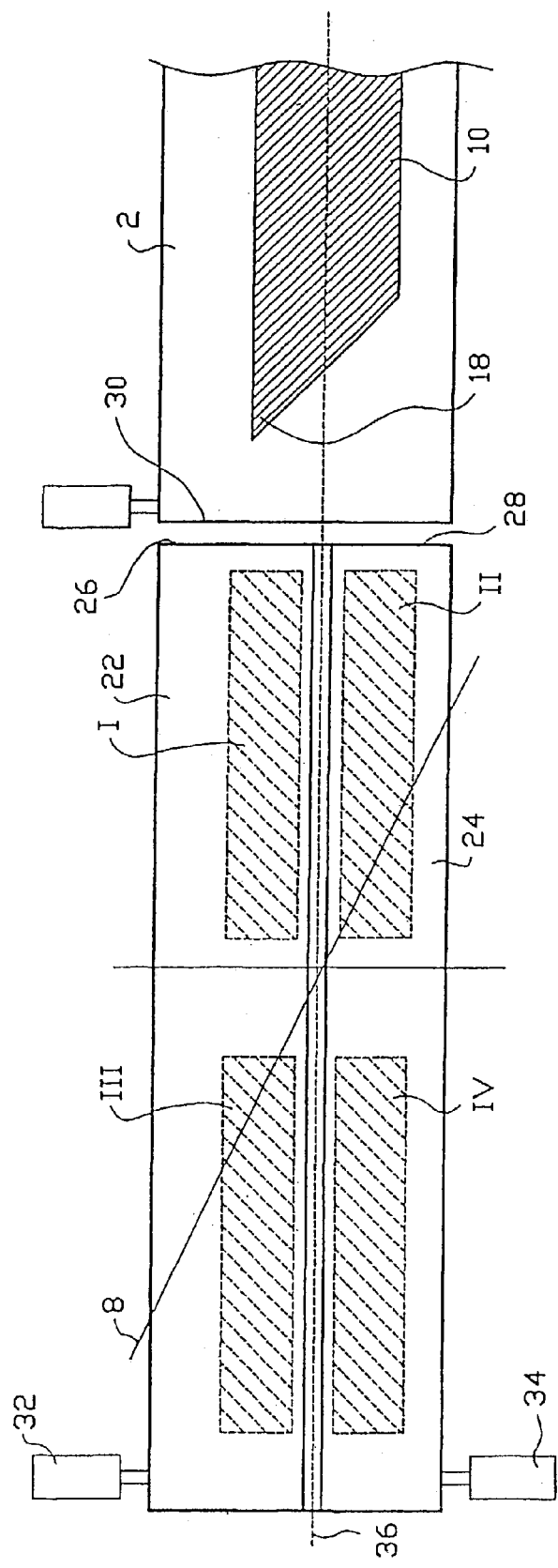

SPLICER FOR SPLICING STRIPS OF IN RUBBER MATERIAL EMBEDDED CORDS TO EACH OTHER

This application is a continuation of PCT/NL01/0064 filed on Sep. 3, 2001.

The present invention relates to a splicer for splicing strips of in rubber material embedded cords to each other, the splicer comprising a supply device having an output side, for supplying the strips in a supply direction, a transport device in line with the supply device and having an input side oriented at the output side of the supply device, the transport device being adapted for transporting the strips, and a splicing unit for splicing strips to each other along a splice line which splice line intersects the transport device at an angle $\alpha$.

In most of these splicers only transport means that are placed one behind the other are present, that means, the transport means are placed in line with each other. The strips of in rubber material embedded cords, further referred to as strips, are in general supplied by means of a supply device. The strips then come from a cutting system one by one where at an angle, the cutting angle $\alpha$, strips are cut off from a continuous roll of rubber material, having reinforcement cords in the longitudinal direction. As a result the strips in general have the shape of a parallelogram, having a triangular leading tip and a triangular trailing tip. The separate strips are transported one after the other by means of the supply device to a splicing table, in order to be connected there into one continuous strip.

The operation of such known splicers is as follows. A strip is passed on by means of the simultaneous starting the supply device and a discharge device. The discharge device is stopped the moment the trailing side of the separate strip spliced lastly to the continuous strip is situated on the splicing table at the level of the splice line. At that moment the supply device supplies a new strip and stops at the moment that the leading side of the supplied strip of rubber material is situated on the splice line, against the trailing side of the separate strip spliced lastly to the continuous strip. After that the strips are spliced to each other by means of a splicing unit and the process is repeated.

The splicing unit usually is mounted over the splicing table at an angle equal to the already mentioned cord angle, being the angle at which the embedded cords are situated in the rubber material.

In the practical design a splicing table is often opted for, on which the strips are spliced to each other. Sometimes extending the discharge device up to the supply device is opted for, thus there being no question of a splicing table but a splicing position at the most.

In such known splicers it is a known drawback that the leading tip of the arriving strip of rubber material slides over the splicing table or over a motionless supply device, that is motionless at that moment to keep the rear of the rubber material on the splice line. In particular with narrow and/or limp strips, in particular when the cutting angle is very small and the tip therefore very pointed, the sliding results in a very bad position accuracy, as a result of which the splicing together of the strips is irreproducible and takes place insufficiently accurate. Additionally the sliding results in deformation of the leading and trailing tip, in particular with a cutting angle that is smaller than 30 degrees.

Another important drawback of the devices described above and used up until now is that the entire cycle of splicing and thus the production of such splicers for a large part is determined by the transport time necessary for transporting a strip from the supply device towards the splice line. The transport time is determined by the transport distance from the supply device to the splice line, and by the transport speed. The transport speed is imposed by the transport means used. The transport distance is determined by the maximum length of the strips that have to be processed. By alteration of the cord angle and the width of the strips the length of the cords may vary considerably.

It is an object of the invention to improve on this.

To that end a splicer of the above-mentioned type is characterized in that the transport device comprises at least two transport means that are substantially parallel one to the other.

Because of the parallel transport devices a condition is created as a result of which the strips can be transported without considerably deforming the strips. Moreover it offers a condition to considerably shorten the cycle time. As a result it is possible namely to separate functions, and for instance create transport areas of different speeds.

The strips of in rubber material embedded cords to be spliced together in general are strips of unvulcanized rubber material, with in it cords that are substantially parallel to each other. Said cords are oriented at an angle to the centre line of the strips. In the strips the cords generally run substantially parallel. Because the rubber is unvulcanized, it is generally sticky and easy to deform.

The strips are mainly used as carcass layers in the manufacturing of tyres such as car tyres and lorry tyres. For that purpose its cutting angle in general is 17 degrees to 75 degrees. For the use in tyres the cords will in general be of steel, rayon, or synthetic material such as nylon, polyester or fibres such as twaron® or kevlar®. The device according to the invention is particularly suitable for strips reinforced by steel cords.

The splicing to which the invention relates is also called butt-splicing (obtuse or splicing in an abutting manner). Here the strips of in general sticky unvulcanized rubber material are pressed against each other and for instance a little wheel is moved over the splice so that the strips are going to form one unity. The ends of the strips are laid against each other in an abutting manner, so without overlap. An expert is familiar with such and other usable ways of splicing.

Preferably at least two transport means that are parallel one to the other almost fit laterally. As a result it is possible to transport the usually limp and sticky strips without deformation. Preferably at least two transport means are situated adjacently and practically abutting each other. In that way, when using for instance conveyor belts, the strips can be completely supported over their entire surface.

It is preferred that every two transport means that are parallel one to the other are adapted for transporting strips in cooperation with each other. As a result parallel transport means can be operative in turns and possibly simultaneously. As a result a strip can be transported while a strip lies ready and for instance be spliced to a strip that lies ahead of it. As a result the cycle time can be shortened, and deformation of the strips is prevented. To that end it is preferred that the transport means are each provided with their own separate drive means.

In order to obtain a good coordination of the transport means it is preferred that the drive means are connected one to the other by means of control means. Preferably the control means are computer means provided with means for actuating drive means depending on a predetermined position of the strips. To that end the splicer is provided with sensors, preferably optical sensors for detecting the position of the strips, and informing software means of said positions, which software means are loaded in the computer means. The software means subsequently control the drive means of the transport means and activate the splicer. After splicing the software means control the further transport of the strips.

An optimal device is obtained when at least four transport means are used. This creates the possibility to keep the distance between the strips during transport as small as possible, and yet avoid deformation of the strips to a large extent. To further optimize the splicer, the splicer comprises at least four transport means two of which at least of unequal length.

In order to let the transfer of the one conveyor belt to the next run smoothly, it is preferred that a first transport means extends from the output side of the supply device up to a first position before the splice line of the splicer and a second transport means extends substantially parallel to the first transport means from the output side of the supply device up to a second position between the splice line and the first position. When additionally third and fourth transport means extend in line with the first and second transport means, and next to each other and parallel one to the other, from the first and the second position, respectively, to beyond the splice line, the conditions have been created to guarantee a maximum passage time and a minimum deformation of the strips.

A simple embodiment is obtained when the transport means comprise conveyor belts. The conveyor belts support the strips and prevent deformation. Additionally the position of the strips on the conveyor belts can easily be fixated by means of the following measures, that are easy to implement.

The transport means may for instance comprise grip-altering means. In that way the influence of the transport means on the strips can be varied, so that of two parallel transport means for instance the one does not work engagingly on the strip portion placed on it and the other does work engagingly on the strip portion placed adjacently or behind it. As a result, in cooperation with the parallel transport means, easy and fast transport can be realised with little deformation or damage of the strips. Additionally larger accelerations and decelerations can be worked with. Preferably a first transport means comprises grip-enhancing means before the splice line and the second transport means parallel to the first transport means, comprises grip-enhancing means behind the splice line. Additionally it is advantageous when the first transport means comprises grip-lowering means after the splice line and the second transport means comprises grip-lowering means before the splice line.

When said grip-altering means are capable of being selectively switched on, for instance by designing them as electromagnets or means for either lowering or increasing the air pressure, almost complete control over the strips to be moved becomes possible, whereas deformation or damage is minimized. Increasing the air pressure underneath the strips results in an air cushion, lowering the air pressure underneath the strips results in firm attachment of the strips by suction.

By also connecting the grip-altering means to the control means, by providing the software means with means for switching the grip-altering means on and off based on the data regarding the position of the strips, simple process control is possible.

Additionally the invention relates to a splicer of the type mentioned in the preamble of the claim, the transport means comprising conveyor belts having friction altering-means.

The invention is further elucidated on the basis of exemplary embodiments, in which:

FIGS. 1A and 1B show a device according to the state of the art;

FIG. 2 shows an example of deformations of the strips;

FIG. 3 shows a first embodiment of the device according to the invention;

Figure 4A:
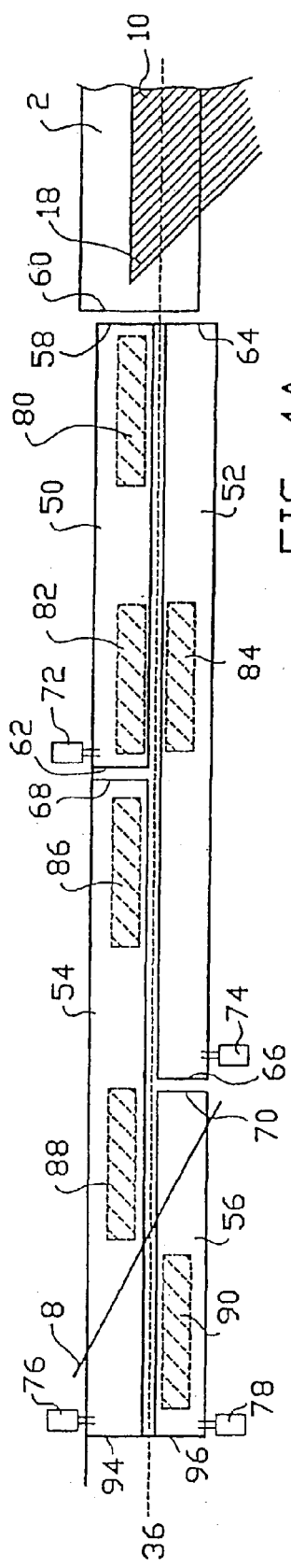
FIGS. 4A–4C show an embodiment having several parallel transport means.

FIG. 1A shows a splicer according to the state of the art. Such a splicer comprises a supply device 2, a transport device 4, a discharge device 6 and a splicing unit (not shown, only splice line 8 is shown). The splicing unit is adapted for splicing the strips 10 to each other along a splice line 8 at an angle 12 equal to the cord angle 13. Possibly a splicing table can be arranged between the transport device 4 and the discharge device 6. The supply device, transport device and discharge device often consist of conveyor belts. The operation of such a known splicer is as follows.

The strips 10 are supplied one by one from a cutting device (not shown) by means of a supply device 2, to a transport device 4 and from the transport device 4 to a discharge device 6 to be connected there with the front or leading side 16 to a trailing or rear side 14 of the departing strip into a continuous consecutive strip by means of the splicing unit.

Here the entire strip 10 is passed on one strip length by means of simultaneously starting the supply device 2, the transport device 4 and the discharge device 6, and stopping the discharge device 6 the moment the trailing side 14 of the continuous strip 10 is situated at the level of the splice line 8. The supply device 2 and the transport device 4 at that moment supply a new strip, as shown in FIG. 1A, and stop the moment the leading side 16 of the supplied strip is situated on the splice line 8, against the trailing side 14 of the continuous strip. This situation is shown in FIG. 1B. After that the strips are spliced together by means of the splicing unit and the cycle is repeated.

In the practical embodiment a splicing table is often opted for on which the strips 10 are spliced together, or integrating the discharge device 6 and the transport device 4 is opted for, so that there is no question of a splicing table but a splicing position at the most. In the device of FIGS. 1A and 1B the position where the splicing takes place (only the splice line 8 is shown) is on the discharge device 6.

In such devices a known drawback is that the leading tip 18 of an arriving strip slides over the splicing table or over a motionless discharge device 6, that is motionless at that moment to keep the trailing side 14 of the continuous strip on the splice line. In particular with narrow and/or limp strips or strips having a sharp tip, their sliding results in a bad position accuracy, as a result of which the splicing together of the strips 10 is irreproducible and takes place insufficiently accurate. Moreover the leading tip 18 will deform because of the sliding, as a result of which the accuracy and the reproducibility of the splice further decreases.

In FIG. 2 the deformation of the tips 18, 20 of the strips 10 is made clear. The strips 10 in general have a triangular leading tip 18 and a triangular trailing tip 20 and particularly with small cord angles a sharp tip may occur which during the sliding is unwantedly directed upwards when the transport device comprises a conveyor belt. FIG. 2 shows the situation during the movement of the strip 10 towards the splicer, or after the material has been pulled over a motionless discharge device 6 or splicing table: Friction between strip 10 and splicing table or conveyor belt results in deformation or twisting of the trailing tip 20. The length of the cords will after all always be the same. The angle may change, and as a result the shape of the tip.

In FIG. 3 a splicer according to the invention is shown. On the supply device 2 a strip 10 is present. In line with the supply device 2 two parallel transport means 22 and 24 are positioned, preferably conveyor belts. The transport means 22, 24 are parallel to each other, and positioned adjacently, the input side 26, 28 of both transport means 22, 24 towards the output side 30 of the supply device 2. The transport means 22, 24 are in line with the supply device. The transport means 22, 24 are positioned for transporting a strip 10 in cooperation one with the other. Both transport means are positioned to be able to support the strips together. The parallel transport means 22, 24 are both equipped with independent drive means 32, 34 that are connected one to the other by means of a control unit (not shown). In a preferred embodiment the transport means are provided with grip-altering means (I, II, III, IV), particularly means for enhancing the grip and means for lowering the grip. Said means may be capable of being switched on, and for instance consist of magnets or vacuum means. As a result a strip 10 can be sucked onto a conveyor belt, or moved on an air cushion (air floatation system) so that the strip does not quite touch a conveyor belt. By choosing a grip that can be switched on, the degree of grip, that means the transporting capacity, or friction between a conveyor belt, can be switched on or off whatever the point in the production cycle is. The grip may be adjustable. Grip-altering means I and IV preferably are grip-enhancing means, grip-altering means II and III preferably are grip-lowering means.

Optimal operation of the splicer shown in FIG. 3 is as follows. A strip 10 is supplied by means of the supply device 2. The centre line 36 of the strip is indicated by a dotted line. On both sides of the centre line 36 the transport means 22, 24 are positioned, a first transport means 22 at the side of the sharp, leading tip of the strip, a second transport means 24 next to the first transport means 22 and parallel thereto. By enhancing the grip in area I, on the first transport means 22, before the splice line 8, and lowering the grip in area II, on the second transport means 24, also before the splice line 8, letting the first transport means 22 at the level of the sharp tip 18 of the strip 10 transport as fast as the supply device 2, and not driving the second transport means 24 next to it, the strip 10 with the sharp tip 18 is fixed and said tip 18 does not deform during transport. It is also prevented that the sharp tip of a strip waiting behind the splice line would deform in area IV because said transport means is not switched on underneath that point. The deformation is further reduced when in area III, on the first transport means 22 behind the splice line 8, the grip or friction is reduced. After the strips 10 are spliced together they are transported further. This preferably takes place as follows. The grip in area IV, on the second transport means 24 behind the splice line 8, is enhanced as is the grip in area I, and both transport means 22, 24 transport the strips 10. Meanwhile the grip in area 11 is lowered again and the supply device 2 supplies a new strip 10 straight after the strips 10 that are spliced together.

The device is provided with sensors, preferably optical sensors, to perceive the leading side of the strips. The sensors are connected to the control means. In the exemplary embodiment the control means are formed by a computer loaded with software. The software processes the position and on the basis of the outcome controls the drive of the conveyor belts.

In FIG. 4A an embodiment is shown with several, specifically four, parallel transport means 50, 52, 54, 56. A first transport means 50 has an input side 58 contiguous to the output side 60 of the supply device 2 and an output side 62 on a first position before the splice line 8 of the splicer. A second transport means 52, parallel to the first transport means 50, has an input side 64 just like the first transport means device 50 contiguous to the output side 60 of the supply device 2, but the output side 66 on a second position between the first position and the splice line 8. The third and fourth transport means 54 and 56 are positioned in line with the first and second transport means 50 and 52 and parallel to each other, the input sides 68, 70 of the third and fourth transport means contiguous to the output sides 62, 66 of the first and second transport means and the output sides 94, 96 at almost the same level. As will appear from the further description, it will be possible as a result to lower the cycle time of the processes. The transport means 50, 52, 54, 56 are provided with various means 80, 82, 84, 86, 88 and 90 for adjusting the grip, preferably means capable of being switched on for enhancing or lowering the grip. In the embodiment as shown in the FIGS. 4A–4C, the numbers 80, 82, 86, 90 are grip-enhancing means capable of being switched on, and the numbers 84, 88 are grip-lowering means which all in the indicated areas adjust the grip to the wanted level.

The operation of the splicer follows from the FIGS. 4B and 4C and will be discussed below. Because of the embodiment of the splicer it is possibly to already supply a strip whereas two other strips are being spliced together. As a result the processing time, particularly as the strips become shorter, can be considerably reduced.

Figure 4B:
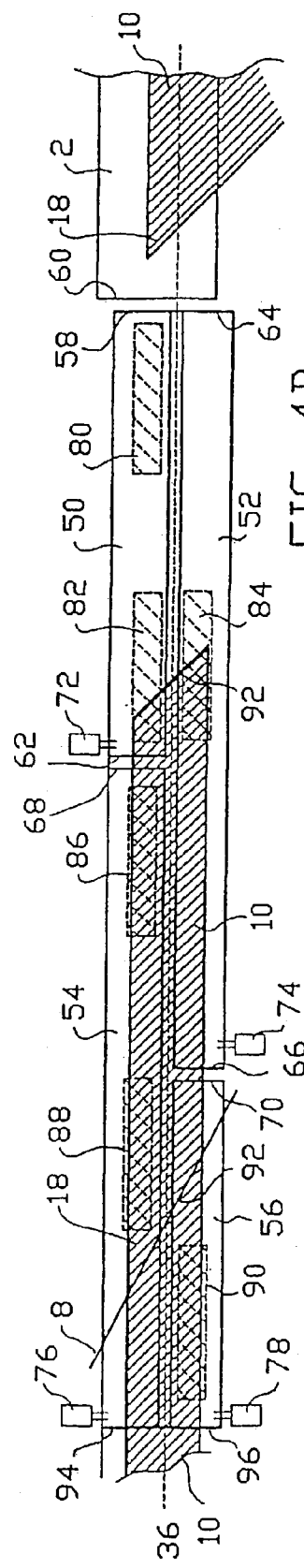
Figure 4C:
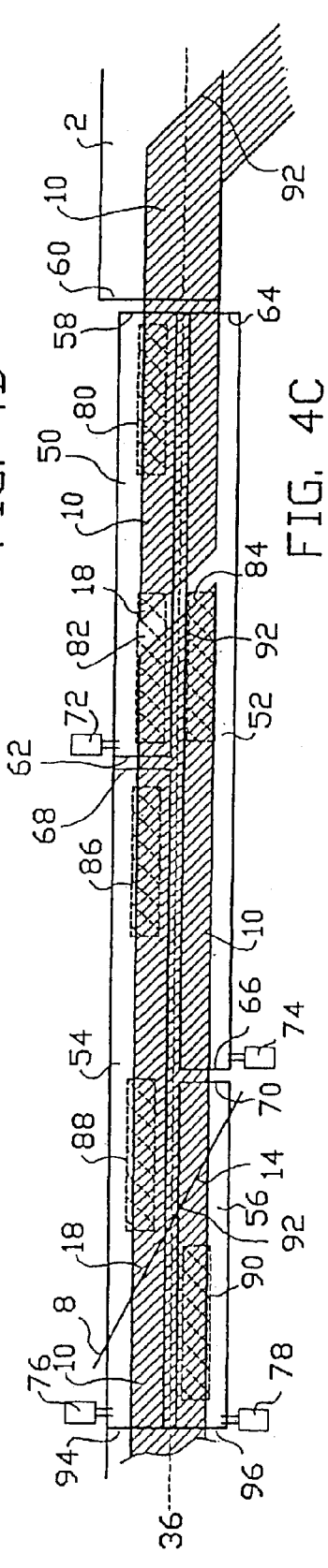

In FIG. 4B it can be seen how two strips 10 abut each other at the location of the splice line 8. A third strip 10 is meanwhile ready on the supply device 2. In FIG. 4C it can be seen that during splicing, the third strip 10 is already moved to the trailing side of the second strip 10. When splicing is finished, the strips spliced together and the third strip 10 can be simultaneously transported because of mutual cooperation of the transport means. During transport of the third strip only transport means 50 will be active. Transport means 52 will be motionless during that time. Because only transport means 50 touches this strip only at the location of the obtuse angle of the second strip, the possibility of damage or deformation of the sharp tip 92 is considerably reduced. By switching on grip-lowering means at the location where transport means 50 supports the strip, the possibility of deformation of the strip at that location can even be further reduced. To allow the transport of the third strip run reliably, grip-enhancing means 80 have been switched on to move the sharp tip 18 in a deformation-free manner by fixation. When the strips approach the splice line 8, first the second strip is positioned contiguously behind the splice line 8.

Transport means 56 is then put to a standstill and transport means 54, that is unable to deform the sharp tip 18, transports the third strip 10 such that it butts the second strip 10.

The device is provided with various optical sensors to measure the position of the leading side of the strips. The sensors, just like the drive means of the transport means and the splicing unit are connected to a computer loaded with software. In the software, means are present for processing the position measured, means for controlling the drive means based on the position measured. Additionally means are present for starting the splicing, and means for transporting the strips connected to each other after splicing.

To optimally adjust the speed of the transport means one to the other, it is preferred to select the slowest transport means as reference and to adjust the other transport means to said slowest transport means.

It is possible to add other options to this splicer. For instance the supply device may be laterally moveable with respect to the transport device. It is also possible to mount the splicing unit rotatable about a vertical axis, which axis is situated between two transport means, in order to adjust the splice angle to the cutting angle.

Because splicing is an intermittent action, and possible winding of the continuous strip formed after splicing preferably takes place continuously, it is preferred that the strip forms a loop behind the splice line and before the winding unit, preferably a supported loop, also for setting off differences of speed. In order to prevent stretching and as a result of it deformation of the continuous strip, said strip is supported in the loop, possibly by grip-enhancing means as well to compensate gravity.

The measures mentioned and other measures that can also be used in the present splicer can be found in the Dutch patent applications 1015250 and 1015437, which are referred to here as if they were completely incorporated in this text.

I claim:

1. A splicer for splicing strips of rubber material with embedded cords to each other, the splicer comprising
    a supply device having an output side for supplying the strips in a supply direction,
    a transport device in line with the supply device and having an input side oriented at the output side of the supply device, the transport device being adapted for transporting the strips, and
    a splicing unit for splicing the strips to each other along a splice line, the splicing unit and splice line being angled to the transport device at an angle $\alpha$ other than 90°,
    wherein the transport device comprises at least two transport means that are substantially parallel one to the other, each of the transport means having its own separate drive means.

2. The splicer according to claim 1, wherein said supply device comprises at least two transport means that are substantially parallel one to the other.

3. The splicer according to claim 2, wherein the transport means of the transport device and the transport means of the supply device are in line with each other and contiguous to each other in a transport direction at spaced apart locations.

4. The splicer according to claim 1, wherein said at least two transport means are almost fitting laterally.

5. The splicer according to claim 1, wherein said at least two transport means are situated adjacently and practically abutting each other.

6. The splicer according to claim 5, wherein every two of the at least two transport means are adapted for transporting the strips in cooperation with each other.

7. The splicer according to claim 1, wherein the drive means are connected to control means.

8. The splicer according to claim 7, wherein the control means are computer means for actuating the drive means in dependence upon a position of the strips.

9. The splicer according to claim 1, wherein said splicer comprises at least four of said transport means.

10. The splicer according to claim 9, wherein at least two of the transport means are of unequal lengths.

11. The splicer according to claim 1, wherein a first of the transport means extends from the output side of the supply device up to a first position before the splice line of the splicer and a second of the transport means extends from the output side of the supply device up to a second position between the splice line and the first position.

12. The splicer according to claim 11, wherein a third and fourth of the transport means extend in line with the first and second transport means and next to each other from the first and the second position, respectively, to beyond the splice line.

13. The splicer according to claim 1, wherein said transport means comprise conveyor belts.

14. The splicer according to claim 1, wherein the transport means comprise grip-altering means.

15. The splicer according to claim 14, wherein the grip-altering means are grip-enhancing means of a first of the transport means before the splice line and a second of the transport means behind the splice line.

16. The splicer according to claim 15, wherein the first transport means further comprises grip-lowering means after the splice line and the second transport means further comprises grip-lowering means before the splice line.

17. The splicer according to claim 14, wherein the grip-altering means are capable of being selectively switched on.

18. The splicer according to claim 17, wherein the grip-altering means are selectively adjustable to increase grip or lower grip.

19. The splicer according to claim 17, wherein the grip-altering means are selectively switched on according to location.

20. The splicer according to claim 14, wherein the grip-altering means are electro magnets.

21. The splicer according to claim 14, wherein the grip-altering means increase or lower air pressure.

22. A splicer for splicing strips of rubber material embedded with cords to each other, the splicer comprising
    a supply device having an output side for supplying the strips in a supply direction,
    a transport device in line with the supply device and having an input side oriented at the output side of the supply device, the transport device being adapted for transporting the strips, and
    a splicing unit for splicing the strips to each other along a splice line, the splicing unit and splice line being angled to the transport device at an angle $\alpha$ other than 90°,
    wherein the supply device comprises at least two transport means that are substantially parallel one to the other, each of the transport means having a drive means.

23. In a method for splicing strips of rubber material embedded with cords to each other, the improvement of a splicer comprising
    supplying the strips in a supply direction with a supply device having an output side,
    transporting the strips with a transport device in line with the supply device and having an input side oriented at the output side of the supply device, and
    splicing the strips to each other along a splice line with a splicing unit, the splicing unit and splice line being angled to the transport device at an angle other than 90°,
    wherein the transport device comprises at least two transport means that are substantially parallel one to the other, each of the transport means having its own separate drive means.

* * * * *